United States Patent

[15] 3,694,650

Coiner

[45] Sept. 26, 1972

[54] CAR COUPLING MAXIMUM SPEED CONTROL SYSTEM

[72] Inventor: Ronald W. Coiner, Irwin, Pa.
[73] Assignee: Westinghouse Air Brake Company, Wilmerding, Pa.
[22] Filed: Nov. 27, 1970
[21] Appl. No.: 93,113

[52] U.S. Cl. .............................. 246/182 B, 303/20
[51] Int. Cl. ............................................. B61l 3/12
[58] Field of Search .................. 246/182 B; 303/20

[56] References Cited

UNITED STATES PATENTS

| | | | |
|---|---|---|---|
| 3,532,878 | 10/1970 | Morrill et al. | 246/182 B |
| 3,463,919 | 8/1969 | Da Rold et al. | 246/182 B |
| 3,385,964 | 5/1968 | Clejan et al. | 246/182 B |

Primary Examiner—Gerald M. Forlenza
Assistant Examiner—George H. Libman
Attorney—Ralph W. McIntire, Jr.

[57] ABSTRACT

A maximum speed control circuit for providing control of brakes on a free-rolling railway car in a classification yard within a speed range having an upper limit defined by the maximum desired speed. Supply of brake pressure occurs when the maximum desired speed is exceeded and is terminated when vehicle speed is reduced below the maximum desired speed, but is not released until the vehicle speed is reduced below a value corresponding to the lower limit of the speed range to thereby limit the cycling frequency of the brakes and consequently reduce the system air consumption without sacrificing brake control. The maximum speed control circuit is combined with a car coupling speed control circuit, which operates whenever the vehicle speed exceeds a safe coupling speed concurrent with another vehicle being sensed within a predetermined distance of the free-rolling car. Release control means is provided to prevent release of braking pressure by either one of the above-mentioned control circuits when the other circuit is providing braking pressure.

7 Claims, 1 Drawing Figure

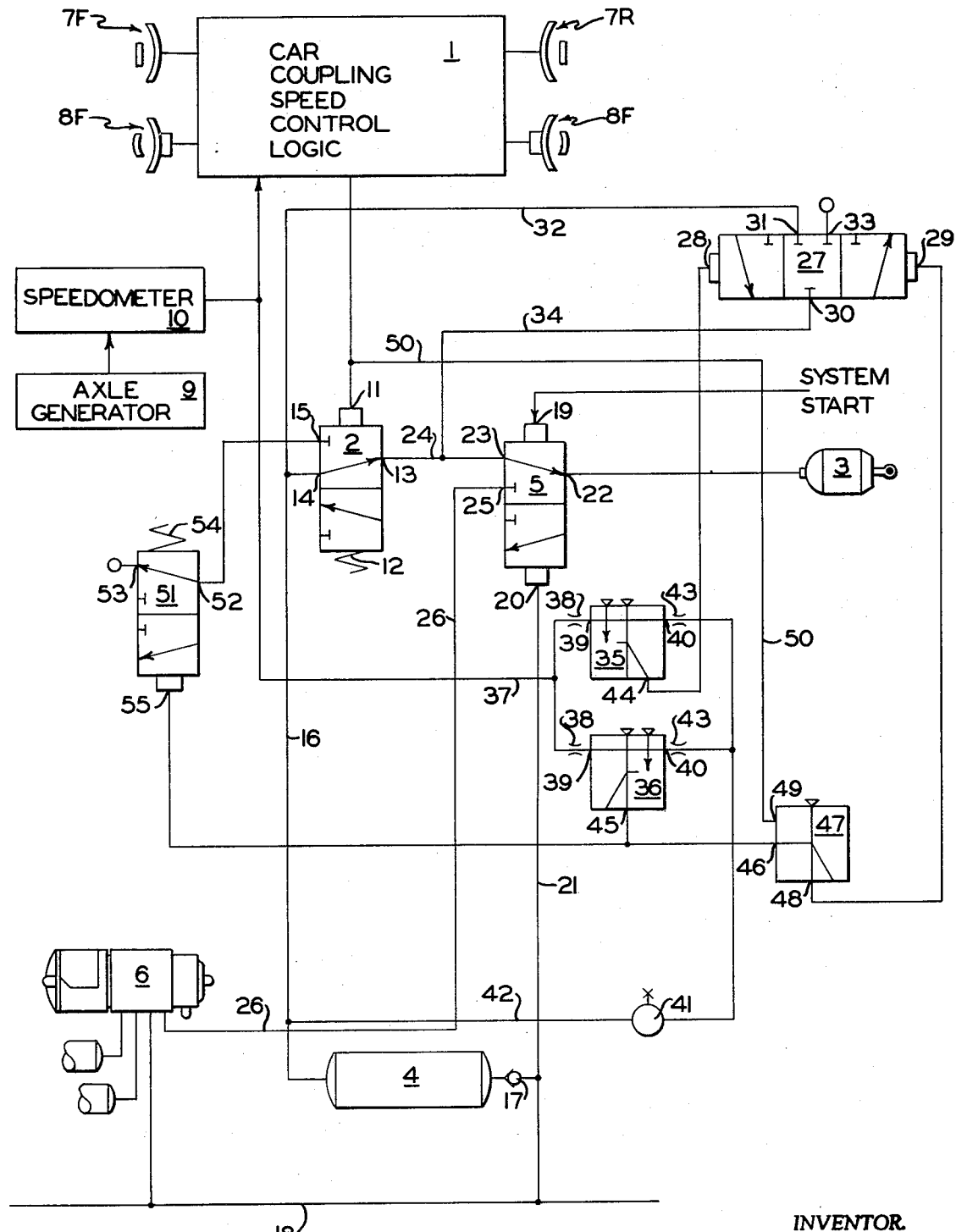

CAR COUPLING MAXIMUM SPEED CONTROL SYSTEM

BACKGROUND OF INVENTION

Due to the limited size of freight car classification yards presently in operation, maximum efficiency of operation must be achieved in order to avoid unscheduled layovers in the classification yard and consequent delays in transporting commodities to their destination. With todays more powerful locomotives and improved brake control systems which permit longer and faster freight train operation, maintaining scheduled movement of cars through the classification yard, particularly during peak economic periods, has become an especially acute problem facing the railroads.

In a typical classification yard operation, cars are released on a raised "hump" track section for free-rolling movement by gravity down the "hump" toward classification tracks where the cars are coupled with a train of cars having a destination along a common route. Appropriate track switches are employed to direct the cars toward the proper classification track, with car retarders being advantageously located along the classification track as well as the "hump" track to control the rate of movement of the cars through the classification yard.

These trackside car retarders may be manually operated or may be automatically controlled by computers. In either case, several variable factors must be considered in order to determine the degree of retardation to be applied by the retarders so that the cars will roll the necessary coupling distance, yet impact the vehicle with which it is to couple with such limited force as to prevent damage from occurring to either the car or its lading. Some of these factors to be considered include knowledge of the number of cars previously coupled on the destination track, which directly influences the distance each subsequent car must travel to effect a coupling, the total weight of the car and its lading, as well as variances in rolling resistance due, for example, to worn journal bearings, wind buffetting, wheel flange/rail friction, etc.

Recently, car carried coupling speed control systems have been disclosed which utilize the car brakes and a supply of air onboard the vehicle to control the car momentum in the classification yard as opposed to utilizing car retarders.

These systems inherently account for the dynamic variances which effect the car rolling ability by controlling car speed within a predetermined distance of another car with which a coupling is imminent so that the impact forces are limited to a safe value. In approaching this predetermined coupling distance, the car should roll through the appropriate track sections at some speed greater than the desired coupling speed to not only assure sufficient car momentum to reach any point of coupling along the track, but to also aid in gaining maximum utilization of the classification yard. The yard grade is normally selected to achieve the desired rolling speed of cars having the worst conditions of rolling resistance. In order to assure that other cars having a lesser degree of rolling resistance do not attain a dangerously high rate of speed, means is normally provided to control the car speed prior to the car approaching the predetermined coupling distance.

Where car carried coupling speed control systems are proposed to obviate the use of car retarders, as above mentioned, it becomes apparent that a car carried maximum speed control system is highly desirable.

In providing a car carried maximum speed control system, the onboard air supply which provides brake pressure under control of the car coupling speed control system must also serve the maximum speed control system so that the size of the AB brake system reservoirs and/or the practical size of a supplemental reservoir which provides the air supply becomes a critical economic factor. Systems which are either on or off, i.e., supply or exhaust brake pressure depending upon whether the vehicle speed being controlled is greater or less than the desired speed, are known to consume an excessive amount of air due to the frequency of the brake cycling.

It is therefore an object of the present invention to provide a maximum speed control system for controlling the car braking within a preselected speed range having an upper limit corresponding to the maximum desired speed in response to which supply of braking pressure is established, and having a lower limit below which the vehicle speed must decrease to establish release of braking pressure.

It is another object of the invention to provide a maximum speed control system arranged with a car carried coupling speed control system for regulating the free-rolling movement of a freight car during classification separate from the automatic car brake control system.

SUMMARY OF INVENTION

Comprising an auxiliary brake control system for controlling the free-rolling movement of a railway car in a classification yard is a car coupling speed control system, of which a sonar vehicle detection circuit is a principle part and a maximum speed control circuit, one or the other of which is operative depending upon the car speed to establish control of the car brakes. The auxiliary brake control system is interlocked with the conventional automatic car brake control system, being activated in response to a brake pipe reduction and a system start signal, which may be generated by means of the vehicle passing over a wayside detector in the classification yard.

The heart of the maximum speed control circuit is a pure fluid speed sensing circuit which produces an application signal for operating a first valve device to supply brake pressure by way of an interlock valve, in accordance with the vehicle speed exceeding a first predetermined rate corresponding to the maximum desired free-rolling speed of the vehicle. When the vehicle speed is reduced below a second predetermined rate, a release signal operates the spool valve to release braking pressure. Within the speed range between the maximum desired speed and a speed corresponding to the second predetermined rate, the spool valve assumes a lap position, preventing supply and release of braking pressure by reason of the application and release signals being absent to thereby limit the frequency of brake cycling and consequently reducing the air consumption of the system.

The car coupling speed control system continuously monitors the track in the direction of vehicle travel and provides a proximity signal when another vehicle is sensed within a predetermined distance. If the vehicle speed is above a safe coupling speed at the time of the proximity signal, a second spool valve device is operated to supply braking pressure by way of the interlock valve until the vehicle speed is reduced to a safe coupling speed.

Other objects and attendant advantages of the invention will become apparent from the following more detailed description and operation when considered with the accompanying single figure drawing illustrating the system of the invention which is shown partly in block diagram and partly in circuit diagrammatic form.

Incorporated in an auxiliary brake control system having a car coupling speed control circuit is a maximum speed control circuit comprising the invention. A logic circuit associated with the car coupling speed control circuit is represented by block 1, producing an output signal for operating a brake application and release control valve 2 which provides fluid pressure communication between a brake cylinder 3 and either a supplemental reservoir 4 or atmosphere. An interlock valve 5 is arranged in the system to communicate the brake cylinder with either valve 2 or the standard AB type car brake control valve 6, depending upon whether the car is operating as a free-rolling vehicle in a classification yard or as a car whose brakes are controlled by variation of brake pipe pressure in accordance with the well-known automatic brake principle.

A car coupling speed control circuit arranged in the above manner is fully disclosed in copending patent application Ser. No. 80939, filed Oct. 15, 1970 and assigned to the assignee of the present invention. In briefly describing the logic circuit of block 1, a pure fluid oscillator is employed to drive a transmitter device 7F or 7R mounted on a railway car to emit a sonic signal in opposite directions depending upon the direction of vehicle travel. A sonic receiver device 8F or 8R, which may also be mounted similar to the transmitters, is selected in accordance with the direction of vehicle travel to recognize reception of sonic signals when reflected from an object such as a stationary vehicle with which the free-rolling vehicle is to couple. In this sense, the receivers 8F and 8R are frequency selective so as to recognize only reflected signals corresponding to the sonic signals generated by the operative transmitter device. The logic circuit of block 1 provides a time duration signal initiated in sequence with the transmitted signal. A coincidence gate compares the time duration signal with a received signal for determining the time required for the transmitted signal to be reflected from another vehicle and received. The time of signal propagation corresponds to the distance between the free-rolling car and the vehicle from which the signal is reflected. The logic circuit thus provides the ability to select only the reception signals which indicate that the proximity of the recognized vehicle is within a preselected distance.

An axle generator device, represented by block 9, produces a train of pulse signals, the frequency of which varies with the vehicle speed. The output of block 9 is fed to a speedometer circuit represented by block 10, which converts the digital pulse signal to an analog signal corresponding to vehicle speed. An example of one such speedometer circuit which is fluidic in nature and is therefore suited to the present invention is disclosed in copending application, Ser. No. 734,073, filed June 3, 1968, now U.S. Pat. No. 3,613,459 and assigned to the assignee of the present invention. A speed detector circuit provided by the car coupling speed control logic of block 1 establishes a rate threshold to which the analog speed output of block 10 is compared. When the vehicle speed exceeds this rate threshold, the output of block 1 calls for a brake application, indicating that an object has been sensed within the preselected distance of the free-rolling car and that the rate of speed of the free-rolling car is exceeding a safe coupling speed.

Brake application and release control valve 2 is a two-position, three-way device having a pilot port 11 which is subject to the output of block 1. A spring 12 is effective to position valve 2 in the absence of fluid pressure at pilot port 11. Valve 2 is further provided with a delivery port 13, a supply port 14 and a vent port 15. Supply port 14 is connected by a line 16 to supplemental reservoir 4 which is normally charged via a one-way check valve 17 with fluid pressure carried in the train line brake pipe 18.

Interlock valve 5 is a two-position, three-connection device having a pilot port 19 subject to a "system start" signal which may be generated by a wayside detector device (not shown) actuated by the car as it is pushed toward the classification yard "hump". An opposing pilot port 20 is connected by line 21 to brake pipe 18. Valve 5 is also provided with a delivery port 22 which is connected to brake cylinder 3, a supply port 23 connected by a line 24 to port 13 of valve 2, and a supply port 25 connected by a line 26 to the car control valve 6.

A brake application and release control valve 27 is controlled in accordance with operation of the maximum speed control circuit to establish fluid pressure communication between supplemental reservoir 4 and brake cylinder 3 or between the brake cylinder and atmosphere, in parallel with valve 2 so that either the car coupling speed control circuit or the maximum speed control circuit is effective to control the free-rolling speed of a vehicle on which the system is provided during classification yard operation, as hereinafter explained. Application and release valve 27 is a three-position, three-connection valve having a pilot port 28 and a pilot port 29. A delivery port 30 is provided for communication with either a supply port 31, connected by a line 32 to line 16 and the supplemental reservoir 3, or a vent port 33. Delivery pressure effective at port 30 is connected by a line 34 to line 24 and supply port 23 of interlock valve 5.

The maximum speed control circuit includes a conventional pure fluid type Schmitt Trigger circuit 35 and a conventional pure fluid Schmitt Trigger circuit 36. Connected to the speedometer circuit 10 by a line 37 and flow restrictors 38 are input ports 39 of each Schmitt Trigger circuit. Provided at the opposing input ports 40 of the Schmitt Trigger circuits is a bias signal corresponding to a different preselected speed to which the respective Schmitt Triggers are to respond. A pressure regulator 41 is connected by a line 42 to supplemental reservoir 4 to maintain a constant fluid pressure supply at input ports 40 via flow restrictors 43, which adjust the bias signal thereat in accordance with the desired speed at which the respective Schmitt Triggers are to respond. Schmitt Trigger circuit 35 is arranged in an OR logic configuration, having an OR output 44 connected to pilot port 28 of valve 27. Schmitt Trigger circuit 36 is arranged in a NOR logic configuration, having its NOR output 45 connected to an input 46 of a conventional pure fluid NOR element 47, the NOR output 48 of which is connected to pilot port 29 of application and release 27. NOR element 47 is also provided with an input 49 for connection by a line 50 to the output of block 1, the purpose being to suppress a release signal provided by Schmitt Trigger 36, by way of element 47, to prevent exhaust of brake cylinder pressure at valve 27 during the period that the car coupling speed control system is calling for a brake application by way of valve 2, as hereinafter explained.

A two-way, two-connection cut-off valve 51 is provided to accomplish a function similar to that of element 47, by preventing exhaust of brake cylinder pressure via valve 2 during the period that the maximum speed control circuit is calling for a brake application by way of valve 27, as hereinafter explained. Valve 51 is provided with a port 52, which is connected to vent port 15 of valve 2, and an exhaust port 53. A spring operator 54 positions valve 51 in the absence of a signal at a pilot port 55 thereof, which is connected to the NOR output 45 of Schmitt Trigger 36.

In now describing the operation of the auxiliary brake control system as arranged with the maximum speed control circuit, let it be assumed that a train of railway cars equipped in accordance with the system above described are brought into a classification yard in the usual fashion. The cars are left in a condition of having their brakes applied by reason of the train locomotive being disconnected from the train of cars so that the train lined brake pipe 18 of each car is vented by way of the open brake pipe at the point where the locomotive is disconnected from the cars. Consistent with the well-known operation of the standard AB type freight brake equipment, the car brakes are caused to apply by reason of the auxiliary and emergency reservoirs associated with the AB brake equipment being connected by control valve 6 and pipe 26 to port 25 of interlock valve 5. Until a "system short" signal is applied to pilot port 19, valve 5 remains in a position in which port 25 is communicated with port 22 and brake cylinder 3 which is operated in response to the auxiliary and emergency reservoir pressure being equalized therewith. Valve 5 normally assumes this position in accordance with brake pipe pressure being established at pilot port 20 prior to being subsequently vented in the classification yard. This position is represented by the flow connections shown diagrammatically in the lower valve envelope. In addition to port 25 being communicated with port 22, it will be seen that port 23 is blanked, thereby establishing the standard automatic brake system as the controlling system.

Prior to moving the train of cars to the classification yard "hump" for movement to the proper destination track, the conventional release valve device associated with the standard AB brake equipment is operated on each car to exhaust brake cylinder pressure, thereby releasing the car brake without depleting either the auxiliary or emergency reservoir pressures. In preventing loss of the remaining reservoir pressure when releasing brake cylinder pressure, this well-known function of the release valve aids in considerably shortening the time required to subsequently recharge the brake system when a new train is finally made up. After releasing the car brakes, a pusher locomotive is employed to push the string of cars up to the "hump".

As previously mentioned, a wayside detector device may be located along the track approach to the "hump" in order to operate means on each car for providing pressure at pilot port 19 of interlock valve 5, as the car passes the detector. In this manner the "system start" signal effective at pilot port 19 of valve 5 is generated and due to the absence of brake pipe pressure at pilot port 20, valve 5 is caused to assume the position shown diagrammatically by the flow connections represented in the upper envelope. In this position of valve 5, port 25 which is connected by line 26 to control valve 6 is blanked and port 22 is communicated with port 23. The system is consequently conditioned so that brake cylinder pressure is now able to be controlled by either application and release valve 2 in accordance with operation of the car coupling speed control circuit of which block 1 is the control element or by the application and release valve 27 in accordance with operation of the maximum speed control circuit of which Schmitt Triggers 35 and 36 are the control elements.

In order to best utilize the maximum speed control circuit, the speed at which the cars roll down the "hump" and through the classification yard is such that a car with the greatest rolling resistance and least load will attain at least the upper speed limit for which the maximum speed control circuit is set. The set point corresponding to this upper limit, which may be assumed to be 11 mph., is provided by restrictor 43 of Schmitt Trigger 35, which establishes the desired bias signal at input 40. When the vehicle speed slightly exceeds 11 mph., as indicated by the analog pressure provided by speedometer block 10 and effective at input 39 of Schmitt Trigger 35, a pressure differential is established between inputs 39 and 40, with the predominant pressure at input 39 resulting in output 44 being pressurized to provide a pilot signal at port 28 of valve 27. In the absence of a signal at pilot port 29, valve 27 is shifted to application position, in which position the flow connections represented diagrammatically in the left-hand envelope are established. In this sense, port 30 is communicated with port 31, thereby connecting brake cylinder 3 to fluid pressure in reservoir 4 via lines 16 and 32, valve 27, line 34 and the flow connection established by valve 5 until fluid pressure equalization occurs. The brakes on the car are consequently caused to apply.

As the vehicle speed is subsequently reduced below the maximum desired speed by the effective brake application, the pressure differential between inputs 39 and 40 of Schmitt Trigger 35 is reversed, thereby removing the pressure signal at output 44 of Schmitt Trigger 35 and consequently depressuring pilot port 28 of valve 27. Having a center lap position to which the valve 27 is biased in the absence of pilot signals at ports 28 and 29, ports 30, 31 and 33 are all blanked, as shown diagrammatically in the middle envelope.

The supply of brake cylinder pressure is consequently terminated until the vehicle speed again exceeds 11 mph. If the vehicle speed continues to reduce below a second level, which may be assumed, for example, to be 6 mph., the brake application will then be released. Restrictor 43 provides the set point bias signal at input 40 of OF Schmitt Trigger 36 corresponding to a speed of 6 mph. As long as the speed signal effective at input 39 is above a value corresponding to 6 mph., output 45 is pressurized and consequently input 46 of NOR element 47 is pressurized to maintain output 48 and consequently pilot port 29 of valve 27 depressurized. It will therefore be apparent that as long as the vehicle speed remains between 6 mph., and 11 mph., valve 27 will remain in its center lap position, effectively trapping brake pressure in brake cylinder 4.

Below speeds of 6 mph., the pressure differential between inputs 39 and 40 of Schmitt Trigger 36 is reversed, resulting in the predominant pressure signal being established at input 40 of Schmitt Trigger 36. Output 45 of Schmitt Trigger 36 is consequently depressurized, resulting in input 46 of NOR element 47 and consequently output 48 thereof and pilot port 29 of valve 27 becoming pressurized. In the absence of a signal at pilot port 28 due to the pressure differential across Schmitt Trigger 35 depressurizing its output 44, valve 27 is forced from its center lap position to a release position, as represented by the flow conditions shown in the right-hand envelope. Port 31 is thus blanked and port 30 is connected to vent port 33, thereby connecting fluid pressure effective in brake cylinder 4 to atmosphere via ports 22 and 23 of valve 5, line 34, and valve 27. The effective brake application is thus released until the vehicle speed again exceeds the lower 6 mph. limit of the speed control range in which the maximum speed control circuit is operative, at which time the lap condition of the circuit will be reestablished. It will thus be seen that the maximum speed control circuit will regulate the vehicle speed within a predetermined range within which lap condition is provided to prevent the alternate supply and exhaust of brake pressure, as otherwise occurs when the brake pressure is applied and released in accordance with the vehicle speed being greater than or less than a predetermined limit. In this manner, excessive cycling of the brake system is prevented and consequently less demand is made upon the critical air supply provided by supplemental reservoir 4.

During operation of the maximum speed control circuit, as the vehicle speed is maintained within the desired range between 6 mph. and 11 mph., the application signal provided by logic block 1 of the car coupling speed control circuit is initially assumed to be absent, even though the vehicle speed is exceeding the 3 mph. limit selected as the safe coupling speed. This would normally be the situation until another vehicle is sensed by the sonic detecting apparatus and determined by the circuit logic of block 1 as being within the predetermined distance in which the vehicle brakes are to be applied to slow the vehicle to the 3 mph. safe coupling speed. Until this occurs, however, the absence of an application signal at pilot port 11 permits spring 12 to position application and release valve 2 in accordance with the flow conditions represented in the lower envelope. Port 13 of valve 2 is consequently communicated with vent port 15. It will now be seen that fluid pressure developed in brake cylinder 3 during operation of the maximum speed control circuit is also connected by way of ports 13 and 15 of valve 2 to port 52 of cut-off valve 51. The purpose of cut-off valve 52 is now apparent. During periods when brake cylinder 3 is pressurized during conditions of brake application and lap following a brake application by the maximum speed control circuit, cut-off valve 51 prevents the escape of brake pressure via vent port 15 of valve 12. Pilot port 55 is pressurized by the output 45 of Schmitt Trigger 36 to position valve 51 to effect the flow condition represented by the lower envelope. In this condition, port 53 of valve 51 is blanked thereby preventing the exhaust of brake pressure via port 15 of valve 2. As previously explained, output 45 of Schmitt Trigger 36 is pressurized in accordance with the vehicle speed exceeding the 6 mph. speed limit corresponding to the lower limit of the speed range in which the maximum speed control system is operative to control vehicle braking. This pressurized condition of output 45 corresponds to application and lap conditions of the maximum speed control circuit.

When the vehicle speed drops below 6 mph., output 45 of Schmitt Trigger 36 and consequently pilot port 55 of cut-off valve 51 are depressurized, allowing spring 54 to position valve 51 in accordance with the flow condition represented in the upper envelope. In this condition, port 52 is communicated with exhaust port 53 of valve 51 to reestablish the normal exhaust communication of valve 2 via vent port 15.

If it is now assumed that another vehicle is detected within the predetermined distance in which the vehicle brakes are to be applied through the car coupling speed control circuit to slow the vehicle to a safe coupling speed, block 1 will provide a brake application signal which is effective at pilot port 11 of valve 2 to effect the flow condition represented in the upper envelope. In this position port 13 is cut off from vent port 15 and communicated with port 14. Consequently, fluid pressure remaining in reservoir 3 is again equalized into brake cylinder 4, but via line 16, ports 14 and 13 of valve 2, line 24, and ports 23 and 22 of valve 5. The resultant brake pressure is effective to retard the vehicle until its speed drops below the 3 mph. safe coupling speed limit dictated by the rate detector circuit of block 1. When this occurs, the brake application signal from block 1 is removed and pilot port 11 of valve 2 is depressurized, allowing spring 12 to position valve 2 to reestablish the flow condition represented in the lower valve envelope. Fluid pressure effective at brake cylinder 4 is then vented via ports 22 and 23 of valve 5, line 24, ports 13 and 15 of valve 2, and ports 52 and 53 of valve 51.

It will be noted, however, that since application and release valve 27 of the maximum speed control circuit is normally maintained in release position in accordance with the vehicle speed being reduced below the 6 mph. lower speed limit, fluid pressure developed at brake cylinder 4 in accordance with a brake application being established by the car coupling speed control circuit would be connected from line 24 and to atmosphere via port 30 and vent port 33 of valve 27. The purpose of NOR element 47 will now become apparent. Input 49 of element 47 is pressurized in response to the brake application signal from block 1. NOR element 47 is switched to its OR state in which condition output 48 and consequently pilot port 29 of valve 27 is depressurized. Since pilot port 28 is normally depressurized at speeds below the upper speed limit of 11 mph., as previously explained, valve 27 is caused to assume a lap condition in which exhaust port 33 is blanked during the period when the car coupling speed control system is providing a brake application. In accomplishing this, it will be seen that the effect of input 49 on NOR element 47 is that of suppressing the normal release signal provided by the NOR output 48, as dictated by Schmitt Trigger 36, until the application signal provided by block 1 is removed in accordance with the vehicle speed being subsequently reduced below the 3 mph. safe coupling speed. Control of NOR element 47 then reverts back to Schmitt Trigger 36, the output of which is depressurized at speeds below 6 mph. to allow the output of NOR element 47 to become pressurized. Pilot port 29 of valve 27 is then pressurized to reestablish the release condition thereof.

From the foregoing, it will be seen that either the maximum speed control circuit or the car coupling speed control circuit which comprise the auxiliary brake control system are effective during car classification to control car retardation by application and release of brake pressure via valve 27 or valve 2, respectively.

Having now described the invention what I claim as new and desire to secure by Letters Patent, is:

1. A brake control system for a railway vehicle having a transmitter device for emitting a signal in the direction of vehicle travel and a receiver device sensitive to the reflection of said emitted signal, said system comprising:
   a. means for providing a speed signal corresponding to the rate of movement of said vehicle,
   b. coupling speed control means for providing a first brake application signal in accordance with said speed signal exceeding a first predetermined rate concurrent with said receiver sensing a reflection of said emitted signal within a predetermined time following transmission thereof indicative of said vehicle being within a prescribed distance of another vehicle from which said emitted signal is reflected,
   c. fluid pressure responsive brake means for controlling the rate of movement of said vehicle,
   d. first valve means operative in response to said first brake application signal to communicate a source of fluid pressure with said brake means and operative in the absence of said first brake application signal to release fluid pressure from said brake means, the improvement comprising,
   e. maximum speed control means responsive to said speed signal for providing a second brake application signal when the speed of said vehicle exceeds a second predetermined rate and a brake release signal when the speed of said vehicle is less than a third predetermined rate, and
   f. second valve means normally disposed in a lap position in which said brake means is interrupted from communication with a source of fluid pressure and atmosphere, said second valve means being operative out of said lap position in response to said second brake application signal to communicate a source of fluid pressure with said brake means and operative out of said lap position in response to said brake release signal to release fluid pressure from said brake means to atmosphere.

2. The system as recited in claim 1, further including means for interrupting release of fluid pressure from said brake means by said first valve means in consequence of pressurization of said brake means by said maximum speed control means and by said second valve means in consequence of pressurization of said brake means by said coupling speed control means.

3. The system as recited in claim 1, wherein said maximum speed control means comprises:
   a. first speed sensing means for providing said second brake application signal in response to said speed signal exceeding said second predetermined rate,
   b. second speed sensing means for providing an output having one characteristic in accordance with said speed signal being greater than said third predetermined rate and another characteristic in accordance with said speed signal being less than said third predetermined rate, and
   c. switch means for providing said brake release signal in accordance with said output being of said another characteristic.

4. The system as recited in claim 3, further characterized in that said switch means is responsive to said first brake application signal to prevent said brake release signal from being provided.

5. The system as recited in claim 3, wherein said first valve means includes release control valve means for interrupting release of fluid pressure from said brake means by said first valve means in response to said output provided by said second speed sensing means being of said one characteristic.

6. The system as recited in claim 3, further characterized in that said second predetermined rate is greater than said first predetermined rate, and that said third predetermined rate is less than said second predetermined rate and greater than said first predetermined rate.

7. The system as recited in claim 1, further including:
   a. a brake pipe in which variation of fluid pressure is provided in accordance with a desired degree of brake application on said vehicle,
   b. brake control valve means responsive to variation of brake pipe fluid pressure in one direction to effect a communication between a source of fluid pressure and said brake means, and responsive to variation of brake pipe fluid pressure in a direction opposite the one direction to effect a communication for releasing fluid pressure from said brake means, and
   c. interlock valve means for selectively establishing fluid pressure communication between said brake means and either said brake control valve means or said first and second valve means.

* * * * *